United States Patent
Sekine et al.

(10) Patent No.: US 9,075,549 B2
(45) Date of Patent: Jul. 7, 2015

(54) PRINTING SYSTEM

(75) Inventors: Masato Sekine, Tokyo (JP); Yutaka Tamada, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 371 days.

(21) Appl. No.: 13/151,438

(22) Filed: Jun. 2, 2011

(65) Prior Publication Data

US 2011/0299120 A1 Dec. 8, 2011

Related U.S. Application Data

(60) Provisional application No. 61/350,616, filed on Jun. 2, 2010, provisional application No. 61/394,531, filed on Oct. 19, 2010.

(51) Int. Cl.
*G06F 3/12* (2006.01)

(52) U.S. Cl.
CPC ............ *G06F 3/1221* (2013.01); *G06F 3/1229* (2013.01); *G06F 3/1286* (2013.01); *Y02B 60/1271* (2013.01)

(58) Field of Classification Search
None
See application file for complete search history.

(56) References Cited

U.S. PATENT DOCUMENTS

| | | | |
|---|---|---|---|
| 2008/0170253 A1* | 7/2008 | Mohammad | 358/1.15 |
| 2008/0186524 A1* | 8/2008 | Morimoto | 358/1.13 |
| 2008/0297830 A1* | 12/2008 | Sewell et al. | 358/1.15 |
| 2009/0109485 A1* | 4/2009 | Yoshida | 358/1.15 |
| 2009/0310169 A1 | 12/2009 | Imaizumi et al. | |

FOREIGN PATENT DOCUMENTS

| | | |
|---|---|---|
| JP | 2003-067172 | 3/2003 |
| JP | 2006-340223 | 12/2006 |
| JP | 2010-161479 | 7/2010 |
| JP | 2010-218239 | 9/2010 |

* cited by examiner

*Primary Examiner* — Ashish K Thomas
*Assistant Examiner* — Keara Harris
(74) *Attorney, Agent, or Firm* — Amin, Turocy & Watson, LLP

(57) ABSTRACT

A printing system according to an embodiment includes: plural printers connected to a network; a user terminal connected to the network; and a print server which receives and saves a print job from the user terminal, and which determines plural printer candidates suitable for executing the print job from among the plural printers connected to the network, monitors an operation mode of the plural printer candidates that are determined, and when plural printer candidates include a printer in a sleep mode, shifts the printer from the sleep mode to an normal operating mode via the network.

17 Claims, 15 Drawing Sheets

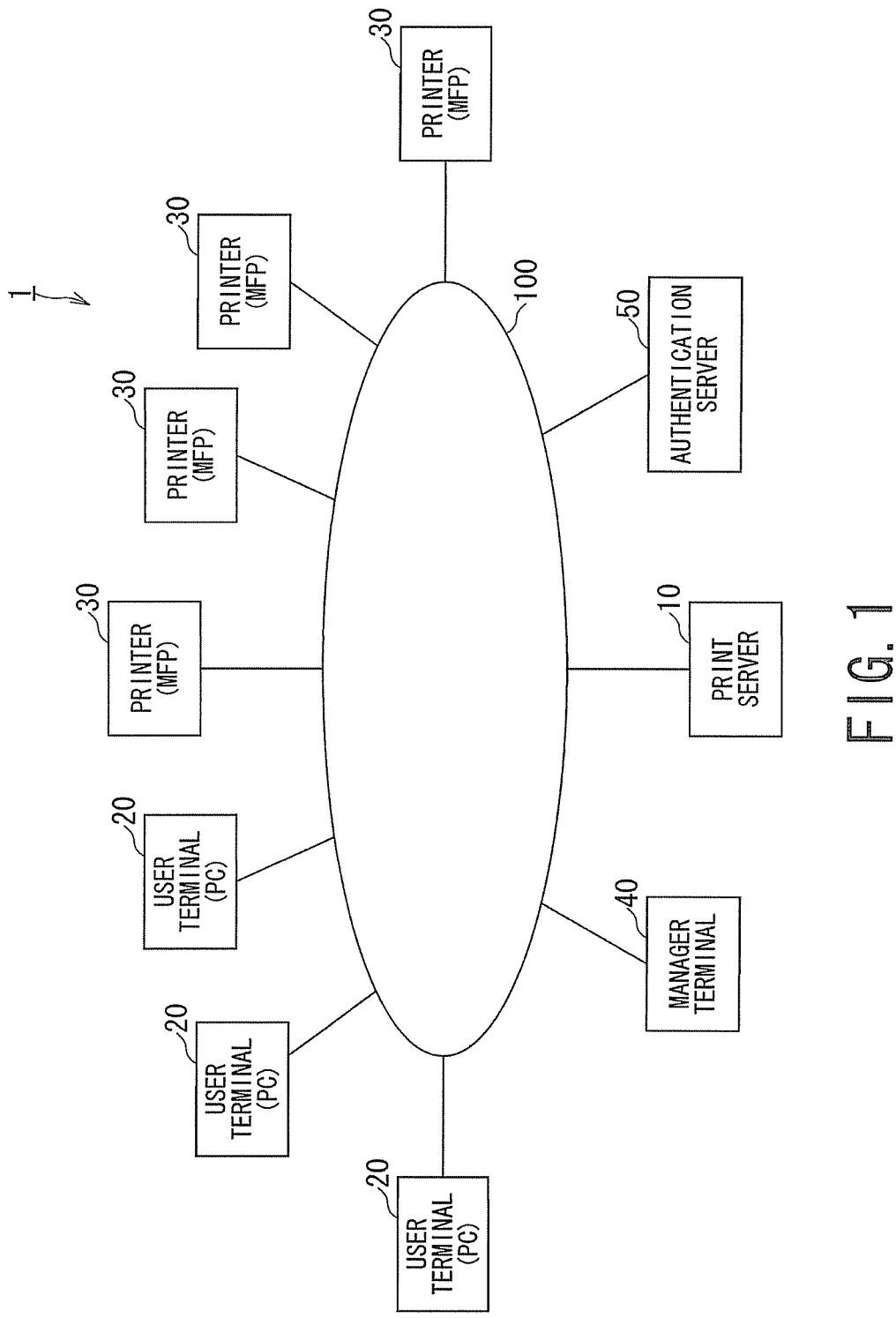
F I G. 1

USE HISTORY INFORMATION
FREQUENCY OF USE RANKING DATA OF PRINTERS
(BY LOCATION OF INSTALLATION) FOR EACH USER

| USER ID | LOCATION OF INSTALLATION OF PRINTER | PRINTER GROUP | RANKING OF LOCATIONS OF INSTALLATION | RANKING OF PRINTER GROUPS |
|---|---|---|---|---|
| USER A | MEETING ROOM A | MEETING ROOM A | 1 | 1 |
| | OFFICE FLOOR 4 EAST | OFFICE FLOOR 4 | 2 | 2 |
| | OFFICE FLOOR 4 WEST | OFFICE FLOOR 4 | 3 | 2 |
| USER B | OFFICE FLOOR 3 NORTH | OFFICE FLOOR 3 | 1 | 1 |
| | MEETING ROOM B | MEETING ROOM B | 2 | 2 |
| | MEETING ROOM A | MEETING ROOM A | 3 | 3 |

F I G. 4

USE HISTORY INFORMATION
FREQUENCY OF USE RANKING DATA OF PRINTERS
(BY GROUP) FOR EACH USER

| USER ID | LOCATION OF INSTALLATION OF PRINTER | PRINTER GROUP | RANKING OF LOCATIONS OF INSTALLATION | RANKING OF PRINTER GROUPS |
|---|---|---|---|---|
| USER A | MEETING ROOM A | MEETING ROOM A | 1 | 1 |
| | OFFICE FLOOR 4 EAST | OFFICE FLOOR 4 | 2 | 2 |
| | OFFICE FLOOR 4 WEST | OFFICE FLOOR 4 | 3 | 2 |
| USER B | OFFICE FLOOR 3 NORTH | OFFICE FLOOR 3 | 1 | 1 |
| | MEETING ROOM B | MEETING ROOM B | 2 | 2 |
| | MEETING ROOM A | MEETING ROOM A | 3 | 3 |

F I G. 5

USE HISTORY INFORMATION
FREQUENCY OF USE RANKING DATA OF PRINTERS
(BY LOCATION OF INSTALLATION) FOR EACH USER TERMINAL

| USER TERMINAL ID | LOCATION OF INSTALLATION OF PRINTER | PRINTER GROUP | RANKING OF LOCATIONS OF INSTALLATION | RANKING OF PRINTER GROUPS |
|---|---|---|---|---|
| USER TERMINAL (A) | OFFICE FLOOR 4 EAST | OFFICE FLOOR 4 | 1 | 1 |
| | OFFICE FLOOR 4 WEST | OFFICE FLOOR 4 | 2 | 1 |
| | MEETING ROOM A | MEETING ROOM A | 3 | 2 |
| USER TERMINAL (B) | OFFICE FLOOR 3 NORTH | OFFICE FLOOR 3 | 1 | 1 |
| | MEETING ROOM C | MEETING ROOM C | 2 | 2 |
| | MEETING ROOM A | MEETING ROOM A | 3 | 3 |

FIG. 6

USE HISTORY INFORMATION
FREQUENCY OF USE RANKING DATA OF PRINTERS
(BY GROUP) FOR EACH USER TERMINAL

| USER TERMINAL ID | LOCATION OF INSTALLATION OF PRINTER | PRINTER GROUP | RANKING OF LOCATIONS OF INSTALLATION | RANKING OF PRINTER GROUPS |
|---|---|---|---|---|
| USER TERMINAL (A) | OFFICE FLOOR 4 EAST | OFFICE FLOOR 4 | 1 | 1 |
| | OFFICE FLOOR 4 WEST | OFFICE FLOOR 4 | 2 | 1 |
| | MEETING ROOM A | MEETING ROOM A | 3 | 2 |
| USER TERMINAL (B) | OFFICE FLOOR 3 NORTH | OFFICE FLOOR 3 | 1 | 1 |
| | MEETING ROOM C | MEETING ROOM C | 2 | 2 |
| | MEETING ROOM A | MEETING ROOM A | 3 | 3 |

FIG. 7

CONFIRM START-UP                                    ✕

THE FOLLOWING MFPS ARE PRINTER CANDIDATES

| MFP NAME | LOCATION OF INSTALLATION | GROUP |
|---|---|---|
| MFP (A) | MEEINTG ROOM A | MEEINTG ROOM A |
| MFP (B) | MEEINTG ROOM B | MEEINTG ROOM B |
| MFP (C) | MEEINTG ROOM C | MEEINTG ROOM C |

START UP?

| YES | NO | SELECT MANUALLY |

FIG. 9

SELECT MANUALLY                                    ✕

CHECK MFP TO BE SELECTED

| MFP NAME | LOCATION OF INSTALLATION | GROUP | CHECK |
|---|---|---|---|
| MFP (A) | MEEINTG ROOM A | MEEINTG ROOM A |  |
| MFP (B) | MEEINTG ROOM B | MEEINTG ROOM B | ✓ |
| MFP (C) | MEEINTG ROOM C | MEEINTG ROOM C |  |
| MFP (D) | OFFICE FLOOR 3 NORTH | OFFICE FLOOR 3 | ✓ |
| MFP (E) | OFFICE FLOOR 3 WEST | OFFICE FLOOR 3 | ✓ |
| MFP (F) | OFFICE FLOOR 3 WEST | OFFICE FLOOR 3 |  |

START UP SELECTED MFP?

| YES | NO |

FIG. 10

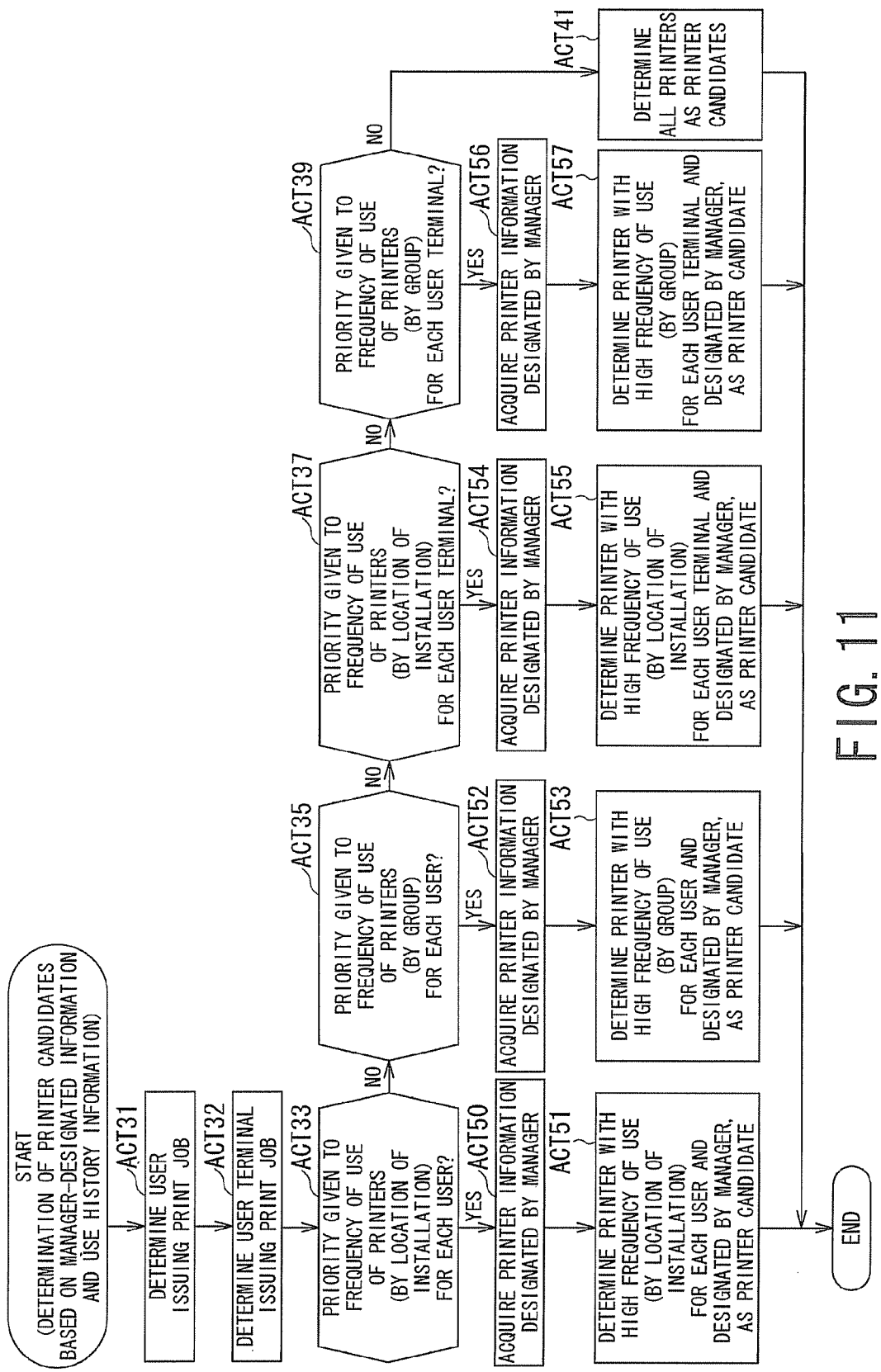
F I G. 11

PRINTER CANDIDATES (BY LOCATION OF INSTALLATION) FOR EACH USER DETERMINED AMONG PRINTERS DESIGNATED BY MANAGER WITHOUT CONSIDERING HIGH FREQUENCY OF USE

| MFP DESIGNATED BY MANAGER | USER ID | LOCATION OF INSTALLATION OF PRINTER | PRINTER GROUP | RANKING OF LOCATIONS OF INSTALLATION | RANKING OF PRINTER GROUPS |
|---|---|---|---|---|---|
| MFP (A) | USER A | OFFICE FLOOR 3 WEST | OFFICE FLOOR 3 | 1 | 1 |
| ✓ MFP (B) | | OFFICE FLOOR 3 NORTH | OFFICE FLOOR 3 | 2 | 1 |
| ✓ MFP (C) | | MEETING ROOM B | MEETING ROOM B | 3 | 2 |
| MFP (D) | | OFFICE FLOOR 3 NORTH | OFFICE FLOOR 3 | 4 | 1 |
| ✓ MFP (E) | | MEETING ROOM F | MEETING ROOM F | 5 | 3 |
| ✓ MFP (F) | | MEETING ROOM A | MEETING ROOM A | 6 | 4 |

FIG. 12

PRINTER CANDIDATES (BY LOCATION OF INSTALLATION) FOR EACH USER DETERMINED ON THE BASIS OF PRINTERS DESIGNATED BY MANAGER CONSIDERING HIGH FREQUENCY OF USE FOR EACH USER

| MFP DESIGNATED BY MANAGER | | USER ID | LOCATION OF INSTALLATION OF PRINTER | PRINTER GROUP | RANKING OF LOCATIONS OF INSTALLATION | RANKING OF PRINTER GROUPS |
|---|---|---|---|---|---|---|
| MFP (A) | ✓ | USER A | OFFICE FLOOR 3 WEST | OFFICE FLOOR 3 | 1 | 1 |
| MFP (B) | ✓ | | OFFICE FLOOR 3 NORTH | OFFICE FLOOR 3 | 2 | 1 |
| MFP (C) | ✓ | | MEETING ROOM B | MEETING ROOM B | 3 | 2 |
| MFP (D) | | | OFFICE FLOOR 3 NORTH | OFFICE FLOOR 3 | 4 | 1 |
| MFP (E) | | | MEETING ROOM F | MEETING ROOM F | 5 | 3 |
| MFP (F) | | | MEETING ROOM A | MEETING ROOM A | 6 | 4 |

PRINTING SYSTEM

CROSS-REFERENCE TO RELATED APPLICATIONS

This application is based upon and claims the benefit of priority from: U.S. provisional applications 61/350,616 filed on Jun. 2, 2010, and 61/394,531 filed on Oct. 19, 2010, the entire contents of each of which are incorporated herein by reference.

FIELD

Embodiments described herein relate generally to a printing system.

BACKGROUND

Conventionally, there is a printing system in which plural user terminals, plural multi-functional machines (multi-functional peripherals (MFPs)), and a print server are connected to a network.

In a printing system of this type having a print server, a print job (including data for print) is sent from a user terminal to the print server and the print server temporarily stores the print job. After that, a user moves to a location where an arbitrary one of the plural multi-functional machines (hereinafter referred to as MFPs) connected to the network is installed. The user then accesses the print job stored in the print server from the control panel of the MFP and shifts the print job from the print server to this MFP to perform printing. In this printing system, a desired MFP can be selected from the plural MFPs to perform printing, which is convenient. For example, the user can print even with an MFP near a meeting room that is located far away from the user's seat. In addition, in the case of so-called private print, since print data is stored in the print server until the user accesses the print server by entering the user ID and password from the control panel of the selected MFP, higher security can be secured than in a type of private print in which print data is transmitted directly to individual MFPs from user terminals.

Meanwhile, many of today's MFPs have one or plural sleep modes. A sleep mode is an operation mode in which, while a network communication function and necessary functions to resume a normal operating mode from the sleep mode are maintained, other functions are stopped in whole or in part, thus realizing power-saving. Although depending on user's settings or the like, for example, if the MFP does not receive any print job for a predetermined period, the MFP automatically shifts from the normal operating mode to the sleep mode. In the normal operating mode, on receiving a print job, the MFP starts printing immediately as long as there are duplicate print jobs. However, when the MFP is in the sleep mode, the MFP needs a start-up period of a predetermined duration to warm up or the like in order to resume the normal operating mode from the sleep mode.

The above printing system using the print server is convenient because the user can select an arbitrary MFP to execute a print job. However, when the selected MFP is in the sleep mode, the MPF needs the start-up time to shift to the normal operating mode, causing an unwanted waiting time.

Thus, a printing system which generates little such waiting time is demanded.

DESCRIPTION OF THE DRAWINGS

In the accompanying drawings,
FIG. 1 shows an exemplary configuration of a printing system according to an embodiment;
FIG. 4 shows the frequency of use of printers (by location of installation) for each user and an example of use history information as a criterion for deciding a printer candidate;
FIG. 5 shows the frequency of use of printers (by group) for each user and an example of use history information as a criterion for deciding a printer candidate;
FIG. 6 shows the frequency of use of printers (by location of installation) for each user terminal and an example of use history information as a criterion for deciding a printer candidate;
FIG. 7 shows the frequency of use of printers (by group) for each user terminal and an example of use history information as a criterion for deciding a printer candidate;
FIG. 9 shows an example of display of a confirmation screen prompting a user to confirm a printer candidate (printer to be started up) determined by a print server;
FIG. 10 shows an example of display of a selection screen for a user to manually select a printer to be started up;
FIG. 11 is a detailed flowchart showing an example of operation to determine a printer candidate based on manager-designated information and use history information in a second example;
FIG. 12 shows a concept of operation to determine a printer candidate for each user within a range designated by a manager;
FIG. 13 shows a concept of operation in which a manager designates a printer candidate with high frequency of use for each user so as to determine a printer candidate.

DETAILED DESCRIPTION

Figure 2:
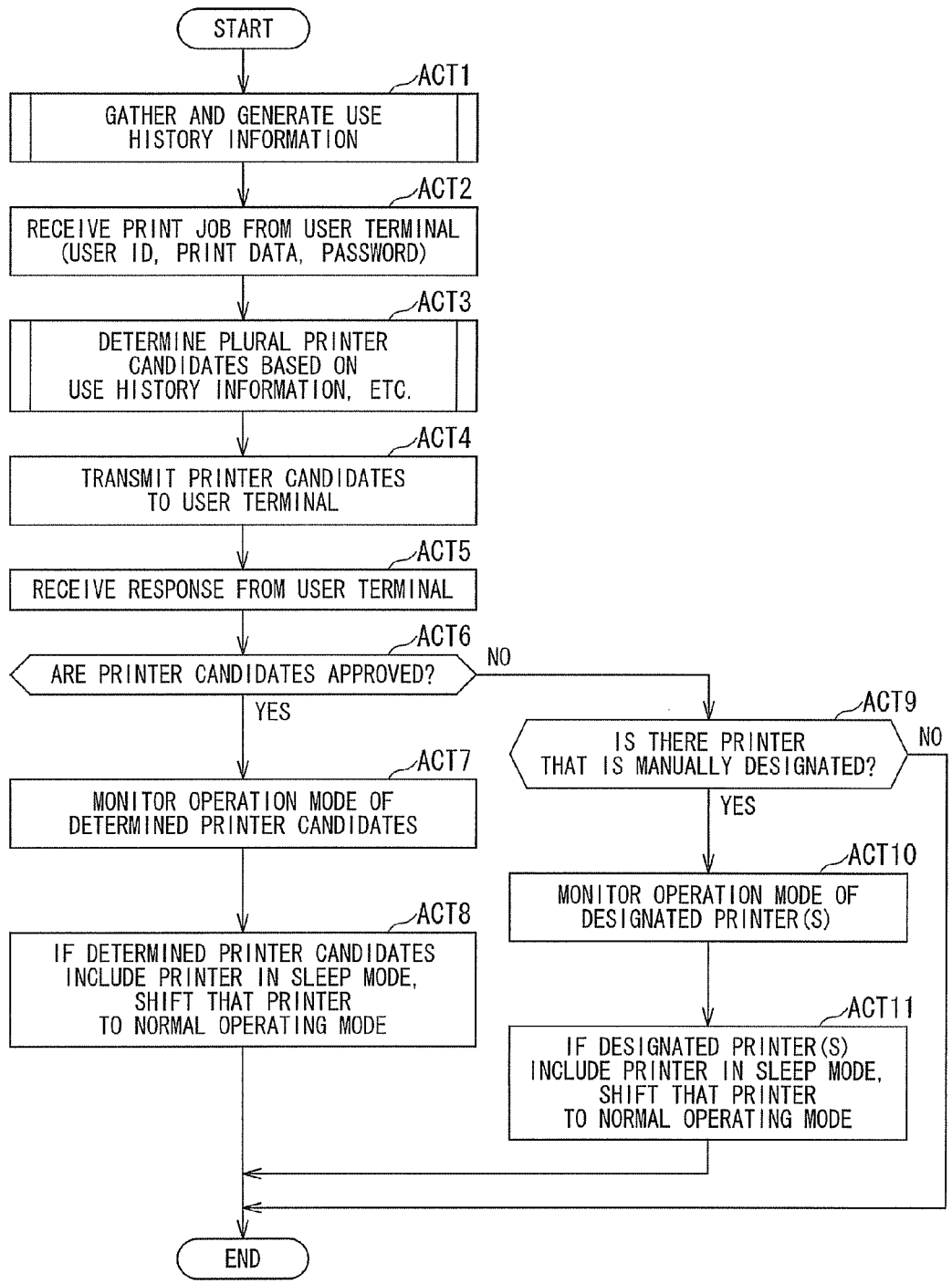
FIG. 2 is a flowchart showing an example of operation of the printing system as a whole.

Embodiments of a printing system will be described with reference to the accompanying drawings.

A printing system according to an embodiment includes: plural printers connected to a network; a user terminal connected to the network; and a print server which receives and saves a print job from the user terminal, and which determines plural printer candidates suitable for executing the print job from among the plural printers connected to the network, monitors an operation mode of the plural printer candidates that are determined, and when plural printer candidates include a printer in a sleep mode, shifts the printer from the sleep mode to a normal operating mode via the network.

(1) Configuration

FIG. 1 shows an exemplary configuration of a printing system 1 according to this embodiment. The printing system 1 includes a print server 10, one or plural user terminals 20, and plural printers 30. The print server 10, the user terminals 20 and the printers 30 are connected to a network 100 such as an in-house LAN and are configured to be able to communicate with each other.

The print server 10 receives and saves a print job from the user terminal 20. The print server 10 also determines plural printer candidates suitable for executing the received print job, from among the plural printers 30 connected to the network. Furthermore, the print server 10 monitors operation modes of the plural printer candidates that are determined, and if the plural printer candidates include a printer in a sleep mode, the print server 10 shifts the printer from the sleep mode to a normal operating mode via the network. Then, if the print server 10 receives a transmission request of the print job from one of the plural printer candidates, the print server 10 transmits the print job saved in the print server 10 to the printer that makes the request. In addition, if the printer 30 that is shifted from the sleep mode to the normal operating mode via the network continues not executing any print job for a predetermined period, the print server 10 forces the printer 30 to shift from the normal operating mode to the sleep mode.

Here, a "print job" is data containing print data such as a document, image or the like and also containing print attribute information such as the number of print copies, discrimination of color print or monochrome print, and whether there are optional functions such as stapling and hole-punching. The print job also contains user identification information (user name, user number, etc.) of a user who issues the print job or identification information of the user terminal 20 (for example, a personal computer) that issues the print job.

The "normal operating mode" is an operation mode in which, on receiving a print job, the printer 30 can print without warm-up. Meanwhile, the "sleep mode" is an operation mode in which the printer needs a predetermined warm-up time to shift to the normal operating mode after receiving a print job. Shifting the operation mode of the printer 30 from the sleep mode to the normal operating mode may be called "start-up" or "resume", both of which are considered to have the same meaning here. More specific operation of the print server 10 will be described later.

The user terminal 20 is, for example, a personal computer as described above. However, without being limited to a personal computer, the user terminal 20 may be a device that can output a document or image, such as a mobile phone, smart phone or tablet computer.

The printer 30 is an apparatus which prints, on a sheet, print data such as a document or image inputted via the network. For example, the printer 30 is a multi-functional machine (multi-functional peripheral (MFP)) which realizes multiple functions such as print function, copy function, and facsimile function, within one machine.

The printing system 1 may also include a manager terminal 40 and an authentication server 50, as shown in FIG. 1. The manager terminal 40 is a terminal apparatus operated by a manager of the printing system 1. Based on information set in the manager terminal 40 by the manager, the print server 10 limits the printer(s) 30 available to the user for use, from among the plural printers 30 connected to the network 100, which will be described later in detail.

The authentication server 50 is a server which performs user authentication, for example, in the case of private print. In private print, when a print job is transmitted from the user terminal 20 to the print server 10, authentication information such as a password is transmitted, too. This authentication information is also sent from the print server 10 to the authentication server 50. After transmitting the print job, the user moves to the location of installation of the printer 30 which the user intends to use to execute the print job, and enters the authentication information such as the password from a control panel or the like of the printer 30, thus accessing the print server 10. The print server 10 collates the entered authentication information with the authentication server 50. If, at the authentication serve 50, the authentication information sent from the user terminal 20 matches the authentication information entered from the printer 30, the print server 10 transmits the print job to the printer 30 that is accessed, and the print job is executed in that printer 30.

Hereinafter, operation of the printing system 1 according to this embodiment, particularly, operation of the print server 10, will be specifically described.

(2) Operation (determination of a printer candidate based on use history, and start-up)

FIG. 2 is a flowchart showing an example of processing related to operation of the printing system 1, particularly to operation of the print server 10.

In ACT 1, the print server 10 gathers information of status of use of the printer 30 for each user or for each user terminal 20, and updates and generates use history information.

Figure 3:
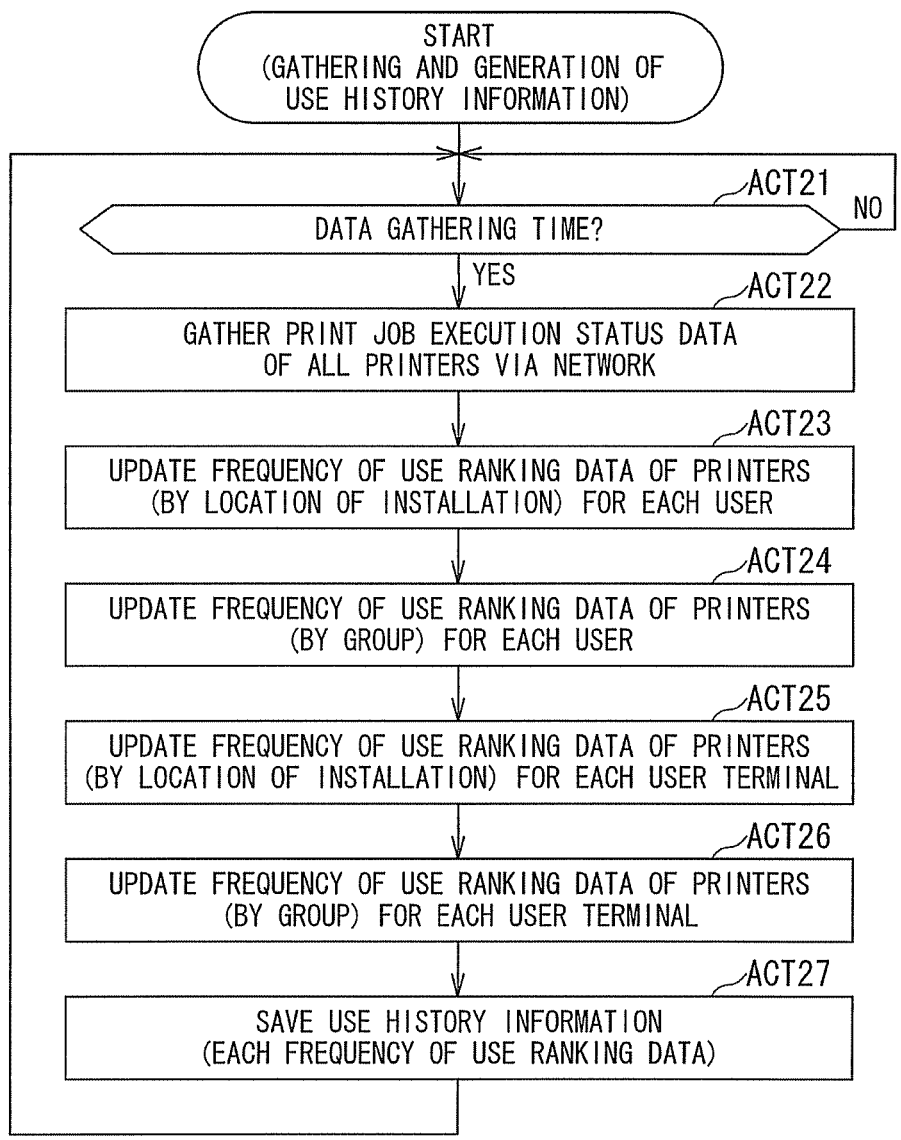
FIG. 3 is a detailed flowchart showing an example of operation related to gathering and generation of use history information.

FIG. 3 is a detailed flowchart showing an example of operation of ACT 1 (gathering and generation of use history information).

In ACT 21, a data collection time is determined. The collection time is defined every predetermined period. Data about a print job execution status in all the printers 30 are gathered via the network 100 every predetermined period (ACT 22). This data gathering is carried out in order to find use history indicating which user (or which user terminal 20) uses which printer 30 what degree of frequency during a predetermined period.

In ACT 23, based on the use status data of the printers 30 that is gathered, the number of times of use of the printers 30 for each user is found, and frequency of use ranking data indicating the ranking in order from the highest frequency of use is found "by location of installation" of the printers 30.

FIG. 4 shows an example of use history information of the printers 30 by location of installation for each user. The ranking shown in the second column from right in FIG. 4 shows the ranking of frequency of use of the printers 30 that are used by user A and user B in the past, by location of installation of the printers 30. This ranking shows that user A uses the printer 30 installed in meeting room A with the highest frequency, uses the printer 30 installed on the east side on floor four of the office with the second highest frequency, and uses the printer 30 installed on the west side on floor four of the office with the third highest frequency. Meanwhile, the ranking shows that user B uses the printer 30 installed on the north side on floor three of the office with the highest frequency, uses the printer 30 installed in meeting room B with the second highest frequency, and uses the printer 30 installed in meeting room A with the third highest frequency.

In ACT 24, based on the use status data of the printers 30 that are gathered, the number of times of use of the printers 30 for each user is found, and frequency of use ranking data indicating the ranking in order from the highest frequency of use is found "for group" of the printers 30.

FIG. 5 shows an example of use history information of the printers 30 by group for each user. Groups mentioned here mean groups of the printers 30. For example, the two printers 30 on the east side and west side on floor four of the office belong to the same group (office floor 4). Meanwhile, the printers 30 installed in meeting room A and meeting room B are regarded as being in separate groups. The ranking shown in the right-end column in FIG. 5 shows the frequency of use ranking of the printers 30 that are used by user A and user B in the past, by group of the printers 30. User A uses the printer 30 of the group (meeting room A) with the highest frequency of use, and uses the printer 30 belonging to the group (office floor 4) with the second highest frequency of use. Meanwhile, user B uses the printer 30 of the group (office floor 3) with the highest frequency of use, uses the printer 30 of the group (meeting room B) with the second highest frequency of use, and uses the printer 30 of the group (meeting room A) with the third highest frequency of use.

In the above ACT 23 and ACT 24, the frequency of use of the printers 30 "for each user" is found "by location of installation" and "by group", respectively. In contrast, in the subsequent ACT 25 and ACT 26, the frequency of use "for each user terminal 20" used by each user is found and updated by location of installation and by group. FIG. 6 shows an example of frequency of use ranking data of the printers 30 (by location of installation) for each user terminal 20. FIG. 7 shows an example of frequency of use ranking data of the printers 30 (by group) for each user terminal 20. In FIG. 6 and FIG. 7, the same data collection method as in FIG. 4 and FIG. 5 is used though different targets of data collection, that is, the user and the user terminal 20, are used. Therefore, further description of FIG. 6 and FIG. 7 is omitted.

The frequency of use ranking data updated in ACT 23 to ACT 26 are saved as "use history information" in a suitable memory within the print server 10 (ACT 27)

As described above, in ACT 1 of FIG. 2, information about the frequency of use is gathered and use history information that is updated every data gathering period is generated.

In ACT 2 of FIG. 2, the print server 10 receives a print job. The print job is transmitted from the user terminal 20 to the print server 10 in response to the user's operation.

On receiving the print job, the print server 10 determines plural printer candidates based on the use history information generated in ACT 1 (ACT 3). The plural printer candidates determined here are used in a way that if these printer candidates include a printer in the sleep mode, that printer is shifted from the sleep mode to the normal operating mode in advance before the user moves to a location of any one of the printer candidates.

Figure 8:
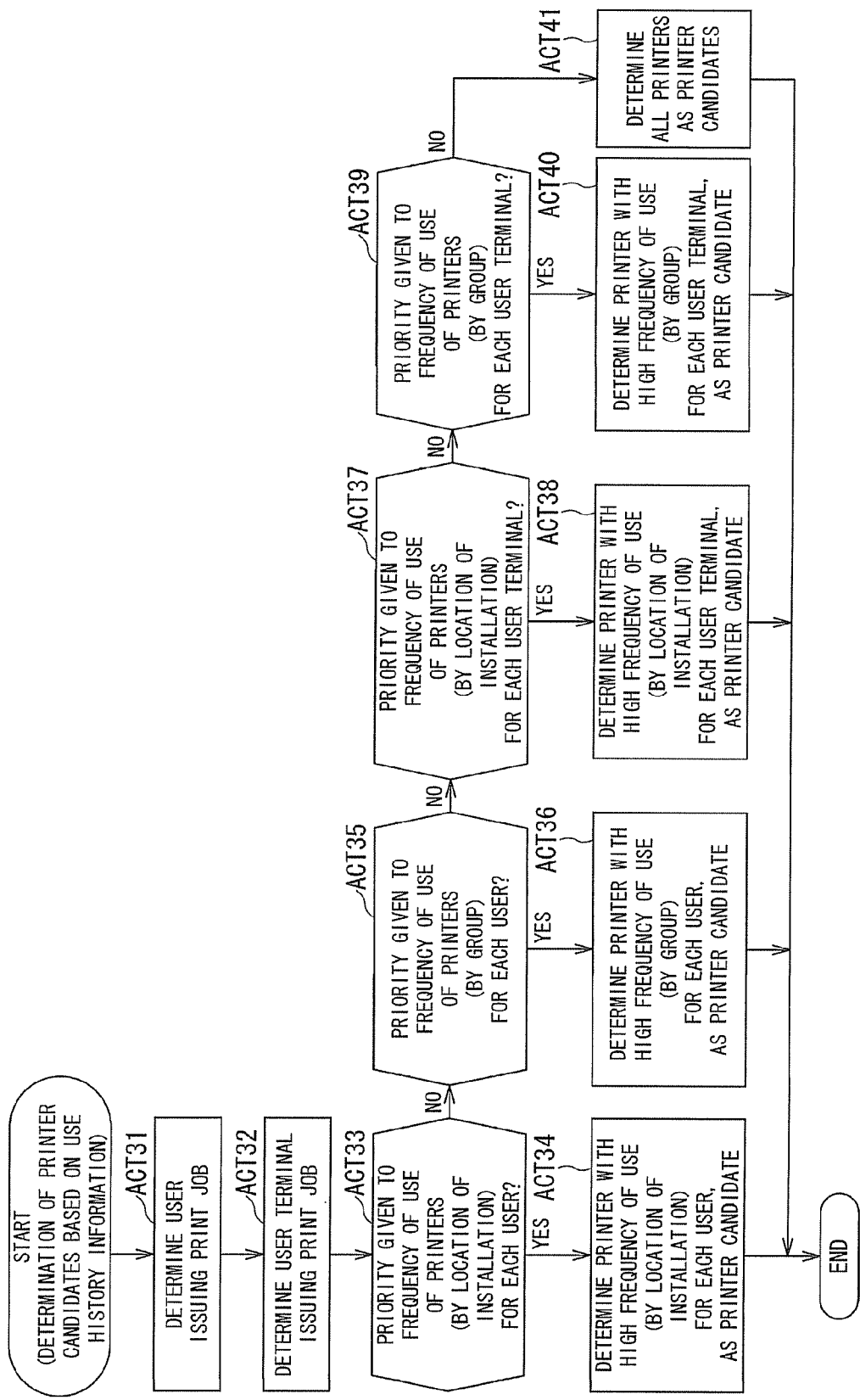
FIG. 8 is a flowchart showing an example of detailed operation of processing to determine plural printer candidates based on use history information.

FIG. 8 is a detailed flowchart showing a detailed example of operation of ACT 3. In ACT 31 and ACT 32, based on the data of the received print job, the user and the user terminal 20 that issue the print job are determined.

In ACT 33, whether to give priority to the frequency of use of the printers (by location of installation) for each user is determined. As described above, the use history information includes the four types of use history information: 1) the frequency of use of the printers (by location of installation) for each user; 2) the frequency of use of the printers (by group) for each user; 3) the frequency of use of the printers (by location of installation) for each user terminal; and 4) the frequency of use of the printers (by group) for each user terminal. Which one of these four types of use history information should be given priority is designated, for example, by the manager of the printing system 1 using the manager terminal 40, and the designation information is transmitted in advance from the manager terminal 40 to the print server 10.

Thus, based on this designation information, the print server 10 determines which use history information should be given priority.

If the frequency of use of the printers (by location of installation) for each user is given priority (YES in ACT 33), printers with high frequencies of use (by location of installation) for each user are determined as plural printer candidates in ACT 34. In the second column from right in FIG. 4, for user A, for example, three MFPs with high frequencies of use (top three in the frequency of use ranking) (MFPs installed in meeting room A and on the east side and west side on floor four of the office) are determined as printer candidates. For user B, for example, three MFPs with high frequencies of use (top three in the frequency of use ranking) (MFPs installed on the north side on floor three of the office and in meeting room B and meeting room A) are determined as printer candidates. Although the number of printer candidates is not limited to three, plural printer candidates are preferable. If there is only one printer candidate and that printer is used by another user, the user must wait until this another user finishes the use, and will end up spending an unwanted waiting time.

If the frequency of use of the printers (by group) for each user is given priority (YES in ACT 35), the top three printers with high frequencies of use (by group) for each user are determined as plural printer candidates in ACT 36 (as in the example in the right-end column in FIG. 5).

If the frequency of use of the printers (by location of installation) for each user terminal is given priority (YES in ACT 37), the top three printers with high frequencies of use (by location of installation) for each user terminal are determined as plural printer candidates in ACT 38 (as in the example in the second column from right in FIG. 6).

If the frequency of use of the printers (by group) for each user terminal is given priority (YES in ACT 39), the top three printers with high frequencies of use (by group) for each user terminal are determined as plural printer candidates in ACT 40 (as in the example in the right-end column in FIG. 7).

Meanwhile, if no priority to any use history information is designated, that is, if no use history information is used, all the printers connected to the network 100 are determined as printer candidates.

Back to FIG. 2, when the plural printer candidates are determined (ACT 3), the print server 10 transmits the determined printer candidates to the user terminal 20 issuing the print job (ACT 4), and asks the user to confirm the determined printer candidates.

On receiving the printer candidates, the user terminal 20 displays, for example, a confirmation screen shown in FIG. 9. On the confirmation screen, the determined printer candidates are displayed and also an indication to prompt selection of whether to start up these printer candidates is displayed ("Yes" and "No" buttons are displayed). In addition, a "Select manually" button is displayed in order to enable, through the user's manual selection, start-up of a printer that is different from the printer candidates determined by the print server 10. As the user clicks on the "Yes" button, a response approving the printer candidates is transmitted to the print server 10. As the user clicks on the "No" button, a response denying the printer candidates is transmitted to the print server 10.

If the "Select manually" button is clicked on, a manual selection screen shown in FIG. 10 is displayed further. As the user clicks on a desired MFP, a check mark (v) is placed in the check space and the desired MFP to be started up is selected. If the "Yes" button at the bottom of the screen is clicked on at this point, the MFP (printer) selected manually by the user is transmitted to the print server 10. If the "No" button is clicked on, a response that the printer candidates are denied and that no manual selection of printer is carried out is transmitted to the print server 10.

On receiving the response from the user terminal 20, the print server 10 determines the content of the response, and goes to ACT 7 if the printer candidates are approved. In ACT 7, the operation modes of the printer candidates are monitored via the network. Then, if the printer candidates include a printer in the sleep mode, the print server 10 shifts the printer from the sleep mode to the normal operating mode (ACT 8)

On the other hand, if the printer candidates are denied but a printer or printers are designated manually by the user (YES in ACT 9), the operation modes of the designated printers are monitored (ACT 10). Then, if the designated printers include a printer in the sleep mode, the print server 10 shifts the printer from the sleep mode to the normal operating mode (ACT 11).

Meanwhile, if the printer candidates are denied and no manual designation of printer is carried out (NO in ACT 9), the flow ends without any further processing.

After that, the user moves to the location of installation of one of the approved printer candidates or the manually designated printers. Then, the user operates a control panel of the MFP (printer) at the location of installation and causes the MFP to execute the print job received by the print server 10 in ACT 2 and thus perform printing.

As described above, in the printing system 1 according to this embodiment, the printer is shifted from the sleep mode to the normal operating mode by the print server 10 before the user moves to the printer from the user's own seat where the user terminal 20 is located. Therefore, the user can immediately start execution of the print job without spending any unwanted waiting time required for warm-up. In addition, the printer candidates are selected from among printers with high frequencies of use by that user. Therefore, the printer candidates are printers near the user's seat or printers which the user is accustomed to using on a day-to-day basis and are very convenient to the user. Furthermore, since plural printer candidates are started up instead of one, even when another user is using one printer, the user can immediately execute the print job with a substitute printer.

(3) Second Example (determination of printer candidates based on use history and manager's designation)

FIG. 11 is a detailed flowchart showing an example of operation in a second example of printer candidate determination in ACT 3 of FIG. 2. In the second example, printer candidates are determined based on both use history information and manager-designated information. Of the processing shown in FIG. 11, ACTs 31, 32, 33, 35, 37, 39 and 41 are the same as the processing shown in FIG. 8 and therefore will not be described further.

The manager may limit the number of available printers connected to the network while considering the balance between saving of electric power and costs of using the printers, and convenience to the user. To limit the number of printers used, the manager designates available printers in advance via the manager terminal 40. In ACTs 50, 52, 54 and 56 of FIG. 11, the print server 10 acquires information of the printers designated by the manager.

Then, the print server 10 determines printers which have high frequencies of use based on use history information and which are designated by the manager, as printer candidates (ACTs 51, 53, 55 and 57). The frequencies of use based on use history information include the four types as described above:
1) the frequency of use of the printers (by location of installation) for each user; 2) the frequency of use of the printers (by group) for each user; 3) the frequency of use of the printers (by location of installation) for each user terminal; and 4) the frequency of use of the printers (by group) for each user terminal. ACTs 51, 53, 55 and 57 correspond to determination procedures based on the respective frequencies of use.

When the manager designates the printers 30, there are cases where the manager designates the printers 30 without considering the frequency of use by the user and where the manager designates the printers 30, considering the frequency of use by the user.

FIG. 12 shows an example in which the manager designates printers without considering the frequency of use by the user. In this example, the manager designates four printers MFP(B), MFP(C), MFP(E) and MFP(F) as available printers, from among the MFPs (printers 30) connected to the network. This designation information is inputted to the print server 10 via the manager terminal 40.

Meanwhile, when the number of printers designated by the manager is greater than a predetermined number of printer candidates, the print server 10 determines printer with high frequencies of use for each user as printer candidates, from among those printers. In the example of FIG. 12, the number of printer candidates by location of installation for each user is three. In this case, MFP(A), top-ranked in the frequency of use ranking for user A, is not designated by the manager and therefore does not become a printer candidate. Therefore, three printers MFP(B), MFP(C) and MFP(E) in order from the highest frequency of use, of the designated four printers, are determined as printer candidates (ACT 51).

FIG. 13 shows an example in which the manager designates the printers 30, considering the frequency of use by the user (modification of the second example). As described above, the print server 10 generates the four types of use history information: 1) the frequency of use of the printers (by location of installation) for each user; 2) the frequency of use of the printers (by group) for each user; 3) the frequency of use of the printers (by location of installation) for each user terminal; and 4) the frequency of use of the printers (by group) for each user terminal. In the modification of the second example, the print server 10 transmits the use history information to the manager terminal 40. Viewing the use history information transmitted thereto, the manager designates the printers 30 with high frequencies of use as printer candidates. For example, as illustrated in FIG. 13, the manager views the use history corresponding to the first to sixth places in the frequency of use ranking and designates the top three printers in the frequency of use ranking, MFP(A), MFP(B) and MFP(C) as printer candidates. The designated printer candidates are sent to the print server 10 from the manager terminal 40. The print server 10 determines the printer candidates designated by the manager, as printer candidates, without any change (ACTs 51, 53, 55 and 57).

As described above, according to the second example, plural printers which have high frequencies of use for each user or the like and which reflect the manager's intention can be determined as printer candidates.

(4) Third Example (determination of printer candidates in consideration of a content of a print job)

Figure 14:
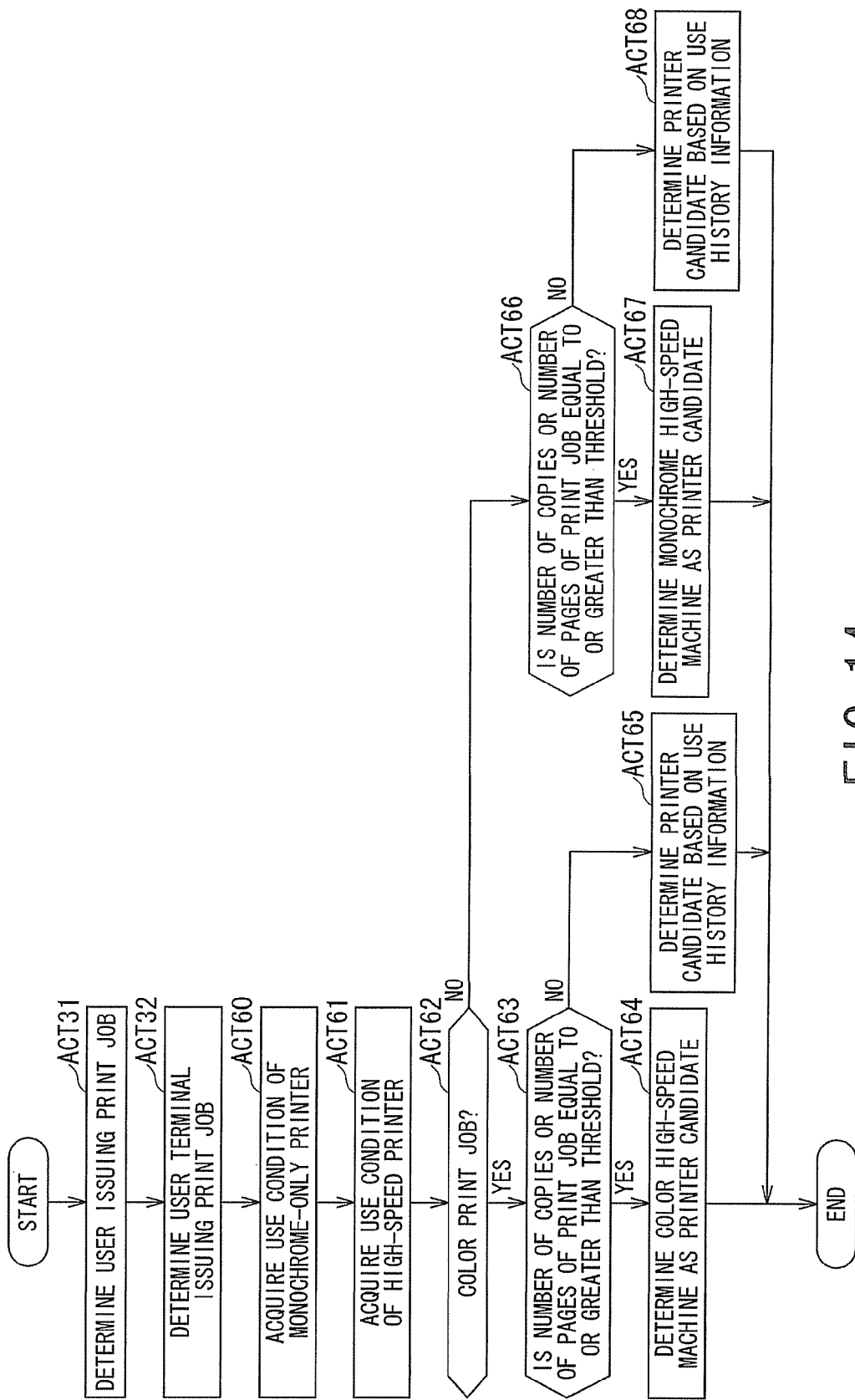
FIG. 14 is a detailed flowchart showing an example of operation to determine a printer candidate in consideration of a content of a print job in a third example.

FIG. 14 is a detailed flowchart showing an example of operation in a third example of printer candidate determination in ACT 3 of FIG. 2. In the third example, printer candidates are determined in consideration of distinction between color print and monochrome print and the number of print pages or the number of print copies.

ACT 31 and ACT 32 in FIG. 14 are the same as in FIG. 8, where the user and the user terminal 20 issuing the print job are determined.

Figure 15:
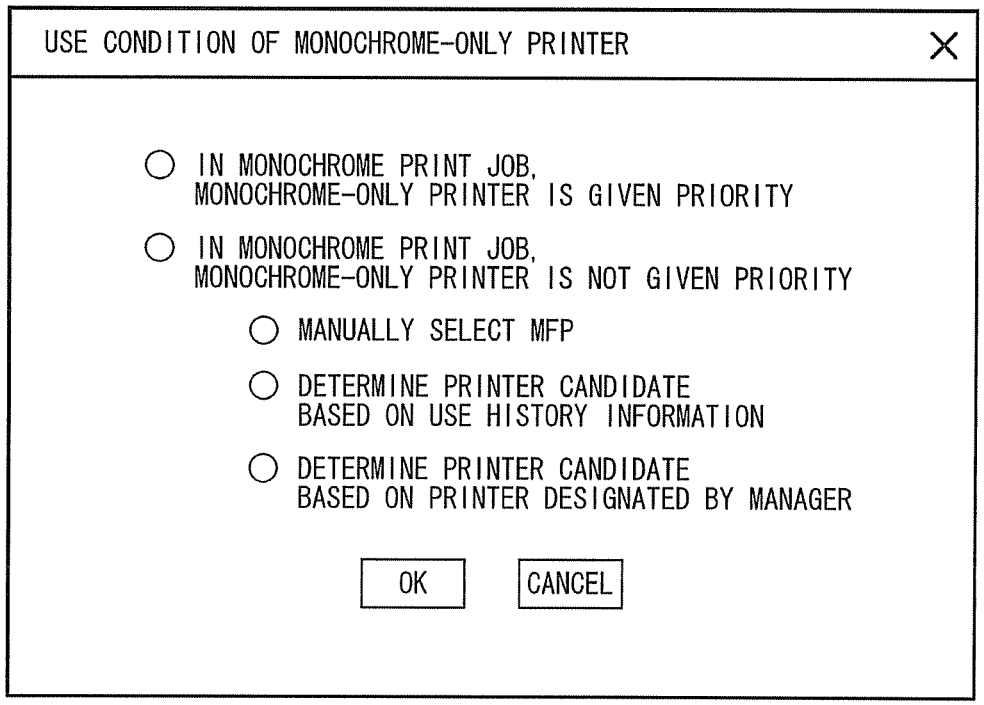
FIG. 15 shows an example of display of an input screen which requires a user to set a use condition of a monochrome-only printer.

In ACT 60, the print server 10 inquires of the manager terminal 40 about use conditions of monochrome-only printers. In response to this inquiry, the manager terminal 40 displays an input screen as illustrated in FIG. 15. On this input screen, in the case of a monochrome print job, whether or not to give priority to monochrome-only machines is set. If a setting to give priority to monochrome-only machines is given, printer candidates to execute the monochrome print job are determined from among monochrome-only machines. On the other hand, if a setting not to give priority to monochrome-only machines is given, printer candidates to execute the monochrome print job are determined without any particular distinction between color machines and monochrome-only machines. Furthermore, on the input screen shown in FIG. 15, whether or not "to select MFPs manually", whether or not "to determine printer candidates based on use history information", and whether or not "to determine printer candidates based on printers designated by the manager" can also be set.

Figure 16:
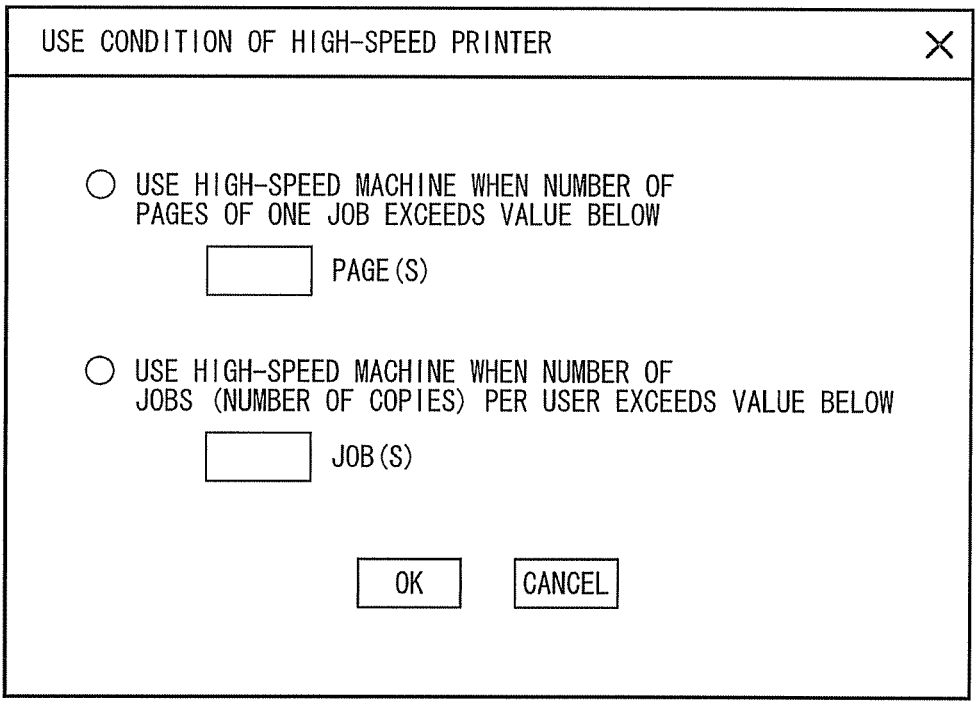
FIG. 16 shows an example of display of an input screen which requires a user to set a use condition of a high-speed printer.

In ACT 61, the print server 10 inquires of the manager terminal 40 about use conditions of high-speed printers. In response to this inquiry, the manager terminal 40 displays an input screen as illustrated in FIG. 16. On this input screen, whether or not to use a high-speed machine if the number of pages in one job exceeds a threshold is set, along with entry of the threshold. In addition, whether or not to use a high-speed machine if the number of jobs (the number of copies) per user exceeds a threshold is set, along with entry of the threshold.

In ACT 62, the content of the print job issued by the user is determined, and whether the print job is a color print job or not is determined. If the print job is a color print job, then in ACT 63, whether the number of pages or the number of copies in the print job is equal to or greater than a threshold or not, is determined. If the number of pages or the number of copies in the print job is equal to or greater than the threshold and the use of a high-speed machine is set in ACT 61, the processing goes to ACT 64 and color high-speed machines are determined as printer candidates. If the number of the color high-speed machines on the network 100 is greater than the number of printer candidates (for example, three), printer candidates are determined from among the color high-speed machines, based on use history information and manager-designated information.

On the other hand, if the number of pages or the number of copies in the print job is smaller than the threshold or if the use of a high-speed machine is not set in ACT 61, the processing goes to ACT 65 and printer candidates are determined from among all color machines without limitation on print speeds, based on use history information and manager-designated information.

Meanwhile, if the print job is determined not as a color print job, that is, determined as a monochrome print job in ACT 62, the processing goes to ACT 66 and whether the number of pages or the number of copies in the print job is equal to or greater than a threshold or not, is determined. If the number of pages or the number of copies in the print job is equal to or greater than the threshold, the use of a high-speed machine is set in ACT 61, and the setting to give priority to monochrome-only machines is given in ACT 60, the processing goes to ACT 67 and monochrome high-speed machines are determined as printer candidates. If the number of the monochrome high-speed machines on the network 100 is greater than the number of printer candidates (for example, three), printer candidates are determined from among the monochrome high-speed machines, based on use history information and manager-designated information.

On the other hand, if the number of pages or the number of copies in the print job is smaller than the threshold or if the use of a high-speed machine is not set in ACT 61, or if the setting to give priority to monochrome-only machines is not given in ACT 60, the processing goes to ACT 68 and printer candidates are determined from among all monochrome machines and color machines without limitation on print speeds, based on use history information and manager-designated information.

In the printing system 1 according to the third example, the printers 30 suitable for execution of a print job can be determined as printer candidates in accordance with the specific content of the print job.

(5) Fourth Example (determination of printer candidates in consideration of optional functions)

Some print jobs need optional functions, such as stapling to staple a sheet bundle after characters and images are printed on sheets, and hole-punching to punch holes in sheets. For print jobs that need such optional functions, it is preferable that the printers 30 capable of executing the optional functions are determined as printer candidates in ACT 3 of FIG. 2.

Figure 17:
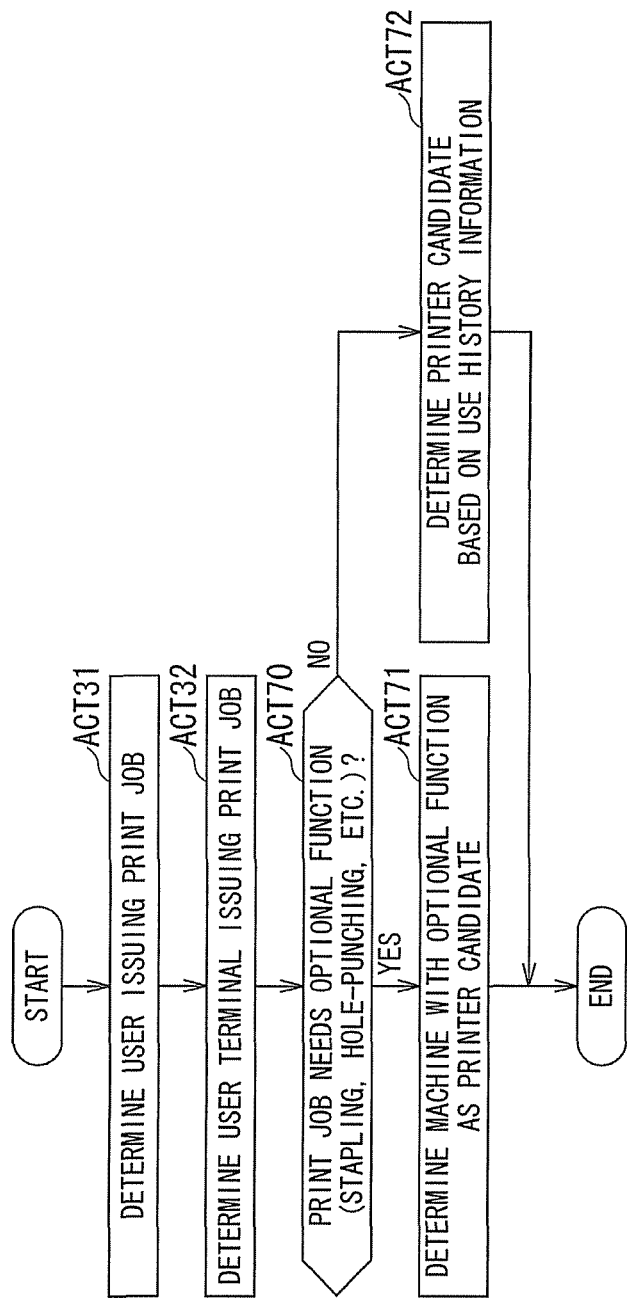
FIG. 17 is a detailed flowchart showing an example of operation to determine a printer candidate in consideration of whether there is an optional function and a content of the function, in a fourth example.

FIG. 17 is a flowchart showing an example of processing in a fourth example in which printer candidates are determined in consideration of optional functions.

ACT 31 and ACT 32 in FIG. 17 are the same as in FIG. 8, where the user and the user terminal 20 issuing the print job are determined.

In ACT 70, whether or not the issued print job needs an optional function such as stapling or hole-punching is determined. If the print job needs an optional function, machines with the optional function are determined as printer candidates (ACT 71). If the number of the machines with the optional function on the network 100 is greater than the number of printer candidates (for example, three), printer candidates are determined from among the machines with the optional function based on use history information and manager-designated information.

On the other hand, if the issued print job does not need optional functions such as stapling and hole-punching (NO in ACT 70), printer candidates are determined from among all the printers 30 connected to the network 100, based on use history information and manager-designated information.

In the printing system 1 according to the fourth example, in accordance with whether a print job needs an optional function or not and the content of the optional function, the printers 30 capable of executing the optional function can be determined as printer candidates.

As described above, in the printing system 1 according to the embodiments, even if the printers 30 connected to the network 100 are in the sleep mode, plural printer candidates are determined in advance and only the determined printer candidates can be shifted from the sleep mode to the normal operating mode and then started up. As a result, the user need not spend any unwanted waiting time required for warm-up in front of the printer, and convenience to the user can be improved.

While certain embodiments have been described, these embodiments have been presented by way of example only, and are not intended to limit the scope of the invention. Indeed, the novel apparatuses and units described herein may be embodied in a variety of other forms; furthermore, various omissions, substitutions and changes in the form of the apparatuses and units described herein may be made without departing from the spirit of the invention. The accompanying claims and their equivalents are intended to cover such forms or modifications as would fall within the scope and spirit of the invention.

What is claimed is:

1. A printing system comprising:
   plural printers connected to a network;
   a user terminal connected to the network; and
   a print server configured:
   to receive and save a print job from the user terminal,
   to determine, in response to the print job, plural printer candidates that have a capability of executing a specific task or an optional function requested in the print job among the plural printers connected to the network,
   to transmit the determined printer candidates to the user terminal and to ask a user of the user terminal to confirm the determined printer candidates,
   on receiving a response approving the printer candidates, to monitor an operation mode of the approved printer candidates, and
   when the approved printer candidates include a printer in a sleep mode, to shift the printer from the sleep mode to a normal operating mode via the network,
   wherein the print server generates use history information showing a past use relation between a printer which executes a print job and a user or the user terminal issuing the print job, and determines plural printers with a high frequency of use as the plural printer candidates, from among the plural printers connected to the network, and
   on receiving the print data together with identification information of the user from the user terminal, the print server determines plural printers installed at a location of installation with a high frequency of use by the user as the plural printer candidates, based on the use history information.

2. The system of claim 1, wherein the normal operating mode of the printer is an operation mode in which, on receiving the print job, the printer can print without warm-up, and the sleep mode is an operation mode in which the printer needs a predetermined warm-up time to shift to the normal operating mode after receiving the print job.

3. The system of claim 1, wherein if the print server receives a transmission request of the print job from one of the plural printer candidates, the print server transmits the print job saved in the print server to the one of the plural printer candidates that makes the request.

4. The system of claim 1, wherein if the printer that is shifted from the sleep mode to the normal operating mode via the network continues not executing any print job for a predetermined period, the print server forces the printer to shift from the normal operating mode to the sleep mode.

5. The system of claim 1, wherein the print server determines all the plural printers connected to the network as the plural printer candidates.

6. The system of claim 1, wherein the plural printers connected to the network are classified into plural groups, and
   on receiving the print data together with identification information of the user from the user terminal, the print server further determines plural printers belonging to a group with a high frequency of use by the user as the plural printer candidates, based on the use history information.

7. The system of claim 1, wherein on receiving the print data together with identification information of the user terminal from the user terminal, the print server further determines plural printers installed at a location of installation with a high frequency of use by the user terminal as the plural printer candidates, based on the use history information.

8. The system of claim 1, wherein the plural printers connected to the network are classified into plural groups, and
   on receiving the print data together with identification information of the user terminal from the user terminal, the print server further determines plural printers belonging to a group with a high frequency of use by the user terminal as the plural printer candidates, based on the use history information.

9. The system of claim 1, further comprising a manager terminal used by a manager of the printing system,
   wherein the print server further determines the plural printer candidates from among plural printers that are further designated by the manager terminal from among the plural printers connected to the network.

10. The system of claim 1, further comprising a manager terminal used by a manager of the printing system,
    wherein the print server further determines the plural printer candidates from among plural printers that are further designated by the manager terminal from among the plural printers connected to the network.

11. The system of claim 6, further comprising a manager terminal used by a manager of the printing system,
    wherein the print server determines the plural printer candidates from among plural printers that are further designated by the manager terminal from among the plural printers connected to the network.

12. The system of claim 7, further comprising a manager terminal used by a manager of the printing system,
    wherein the print server determines the plural printer candidates from among plural printers that are further designated by the manager terminal from among the plural printers connected to the network.

13. The system of claim 8, further comprising a manager terminal used by a manager of the printing system,
    wherein the print server determines the plural printer candidates from among plural printers that are further designated by the manager terminal from among the plural printers connected to the network.

14. The system of claim 9, wherein the print server transmits the generated use history information to the manager terminal so that the manager can limit printers that can be used.

15. The system of claim 1, wherein if the content of the received print job needs color print, the print server determines plural printers capable of color print as the plural printer candidates.

16. The system of claim 1, wherein if the optional function of the received print job needs stapling or hole-punching, the print server determines plural printers capable of the stapling or the hole-punching as the plural printer candidates.

17. A control method of a printing system comprising plural printers connected to a network, a user terminal connected to the network and a print server, the method comprising:
    receiving and saving a print job from the user terminal,
    determining, in response to the print job, plural printer candidates that have a capability of executing a specific task or an optional function requested in the print job among the plural printers connected to the network,
    transmitting the determined printer candidates to the user terminal and asking a user of the user terminal to confirm the determined printer candidates,
    on receiving a response approving the printer candidates, monitoring an operation mode of the approved printer candidates, and when the approved printer candidates include a printer in a sleep mode, shifting the printer from the sleep mode to the normal operating mode via the network, wherein the print server generates use history information showing a past use relation between a printer which executes a print job and a user or the user terminal issuing the print job, and determines plural printers with a high frequency of use as the plural printer candidates, from among the plural printers connected to the network, and on receiving the print data together with identification information of the user from the user terminal, the print server determines plural printers installed at a location of installation with a high frequency of use by the user as the plural printer candidates, based on the use history information.

* * * * *